(12) United States Patent
Gunawardana et al.

(10) Patent No.: US 7,778,945 B2
(45) Date of Patent: Aug. 17, 2010

(54) TRAINING RANDOM WALKS OVER ABSORBING GRAPHS

(75) Inventors: Asela J. Gunawardana, Seattle, WA (US); Christopher A. Meek, Kirkland, WA (US); Ajit Paul Singh, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 11/768,867

(22) Filed: Jun. 26, 2007

(65) Prior Publication Data

US 2009/0006290 A1 Jan. 1, 2009

(51) Int. Cl.
G06F 15/18 (2006.01)
(52) U.S. Cl. ........................................... 706/14
(58) Field of Classification Search ............. 706/14, 706/20; 463/29; 380/251; 707/5, 706, 708, 707/709, 713–719, 737
See application file for complete search history.

(56) References Cited

U.S. PATENT DOCUMENTS

| | | | |
|---|---|---|---|
| 7,548,915 B2 * | 6/2009 | Ramer et al. | 707/5 |
| 2006/0093142 A1 * | 5/2006 | Schneier et al. | 380/251 |
| 2006/0122998 A1 * | 6/2006 | Bar-Yossef et al. | 707/5 |
| 2006/0190225 A1 * | 8/2006 | Brand | 703/2 |
| 2008/0032787 A1 * | 2/2008 | Low et al. | 463/29 |

OTHER PUBLICATIONS

Fouss, et al., "Random-Walk Computation of Similarities between Nodes of a Graph with Application to Collaborative Recommendation", http://www.isys.ucl.ac.be/staff/francois/articles/fouss2006b.pdf, Mar. 2007, vol. 19, No. 3, pp. 355-369, IEE Trans Knowledge and Data Engineering.
Gori, et al., "ItemRank: A Random-Walk Based Scoring Algorithm for Recommender Engines." IJCAI 2007. http://nautilus.dii.unisi.it/publications/files/conference/IJCAI-PucciA.pdf, 6 pages, University Of Siena, Italty.
Brand, "A Random Walks Perspective on Maximizing Satisfaction and Profit", http://www.merl.com/reports/docs/TR2005-050.pdf, Mitsubishi Electric Research Laboratories, 10 pages Dec. 2005.
Adomavicius, et al., "Toward the Next Generation of Recommender Systems: A Survey of the State-of-the-Art and Possible Extensions", IEEE} Trans. Knowledge Data Eng., Jun. 2005, 6 pages, vol. 17, No. 6.

(Continued)

*Primary Examiner*—David R Vincent
(74) *Attorney, Agent, or Firm*—Lee & Hayes, PLLC

(57) ABSTRACT

A random walk is performed over a graph, such as an augmented bipartite graph, relating to ownership data with respect to a plurality of users and items owned; the graph can provide social links between the users as well. Items can be recommended to users who do not own the items by randomly walking the graph starting at the user node to which the recommendation will be given. The random walk can step from user to user or from user to item; when an item is reached, the node can be absorbing such that the random walk terminates. The arrived item is recommended to the user. Parameters can also be provided to affect decisions made during the walk about which users to walk to and/or whether to walk to a user or an item.

20 Claims, 10 Drawing Sheets

OTHER PUBLICATIONS

Cohn, et al., "The missing link—a probabilistic model of document content and hypertext connectivity", Last Accessed on Jun. 25, 2007, 7 pages.

Haveliwala, et al., "Topic-sensitive PageRank: a context-sensitive ranking algorithm for web search", Last Accessed on Jun. 25, 2007, 22 pages, Stanford University.

Richardson, et al., "The intelligent surfer: Probabilistic combination of link and content information in Page Rank", 8 pages, Department of Computer Science and Engineering, University of Washington.

Fouss, et al., "A novel way of computing dissimilarities between nodes of a graph", Workshop on Statistical Approaches to Web Mining, 15th European Conference on Machine Learning (ECML) 8th European Conference on Principles and Practice of Knowledge Discovery in Databases (PKDD) Pisa, Sep. 20-24, 2004, 12 pages.

Albert, et al., "Statistical Mechanics of Complex Networks", Department of Physics, University of Notre Dame, Notre Dame, Indiana, vol. 74, Jan. 2002, 51 pages.

Basilico, et al., "Unifying collaborative and content-based filtering", In Proceedings of the 21st International Conference on Machine Learning, 8 Pages, New York, NY, USA, 2004. ACM Press.

Breese, et al., "Empirical Analysis of Predictive Algorithms for Collaborative Filtering", Technical Report MSR-TR-98-12, Microsoft Research, 1998, 19 Pages.

Canny, "Collaborative Filtering with Privacy via Factor Analysis", Proceedings of the 25th Annual International ACM SIGIR Conference, on Research and Development in Information Retrieval ACM, Aug. 2002, 8 pages.

Dhillon, et al., "Co-Clustering Documents and Words Using Bipartite Spectral Graph Partitioning", Proceedings of the 7th ACM SIGKDD International Conference on Knowledge Discovery and Data Mining, pp. 269-274, San Francisco, California, 2001, ACM Press.

Goldberg, et al., "Using Collaborative Filtering to Weave an Information Tapestry", Commun, ACM, 35(12): 61-70, 1992.

Goldberg, et al., "A Constant Time Collaborative Filtering Algorithm", Inf. Retr., 4(2): 133-151, Mar. 2001.

Hofmann, et al., "Collaborative Filtering via Gaussian Probabilistic Latent Semantic Analysis", In SIGIR 2003, Proceedings from the 26th Annual International ACM SIGIR Conference on Research and Development in Information Retrieval , pp. 259-266, NewYork, NY, USA, 2003, ACM Press.

Kautz, et al., "Referral Web: Combining Social Networks and Collaborative Filtering", Commun. ACM, 40(3):63-65, 1997.

Kleinberg, "Authoritative Sources in a Hyperlinked Environment", J. ACM, 46(5):604-632, 1999.

Kubica, et al., "Finding underlying connections: A fast graph-based method for link analysis and collaboration queries", In Proceedings of the International Conference on Machine Learning, Aug. 2003.

Lempel, et al., "SALSA: The Stochastic Approach for Link-Structure Analysis", ACM Trans. Inf. Syst., 19(2):131-160, 2001.

Linden, et al., "Amazon.com Recommendations: Item-to-Item Collaborative Filtering", IEEE Internet Computing, 7(1): 76-80, Jan.-Feb. 2003.

Malone, et al., "Intelligent Information -Sharing Systems", Commun, ACM, 30(5): 390-402, 1987.

Maltz, et al., "Pointing the Way: Active Collaborative Filtering", In Proc. CHI 95: Human Factors in Computing Systems, 1995.

McJones, http://web.archive.org/web/20040216100752/www.research.compaq.com/SRC/eachmovie/, Last Accessed On Jun. 26, 2007, 3 Pages.

Melville, et al., "Content Boosted Collaborative Filtering for Improved Recommendations", In Eighteenth National Conference on Artificial Intelligence, pp. 187-192, Menlo Park, CA, USA, 2002. American Association for Artificial Intelligence.

Page, et al., "The PageRank Citation Ranking: Bringing Order to the Web", Technical Report, Stanford University, 1998.

Rennie, et al., "Fast Maximum Margin Matrix Factorization for Collaborative Prediction", In Proceedings of the 22nd International Conference on Machine Learning (ICML-05), pp. 713-719, New York, NY, USA, 2005. ACM Press.

Resnick, et al., Grouplens: An Open Architecture for Collaborative Filtering of Netnews:, In CSCW 1994 Proceedings of the 1994 ACM Conference on Computer Supported Cooperative Work, pp. 175-186, New York, NY, USA, 1994. ACM Press.

Roweis, www.cs.toronto.edu/roweis/data.html, Last Accessed on Jun. 26, 2007, NIPS Conference Pagers vols. 0-12, Apr. 2002, Data set.

Sarwar, et al., Analysis of Recommendation Algorithms for e-Commerce:, In EC 2000, Proceedings of the 2nd ACM Conference in Electronic Commerce, pp. 158-167, New York, NY, USA, 2000. ACM Press.

Schein, et al., "Methods and Metrics for Cold-Start Recommendations", In SIGIR 2002, Proceedings of the 25th Annual International ACM SIGIR Conference on Research and Development in Information Retrieval, pp. 253-260, New York, NY, USA, 2002. ACM Press.

* cited by examiner

TRAINING RANDOM WALKS OVER ABSORBING GRAPHS

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting and information gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

For example, collaborative social networking websites have exploded world-wide. These sites allow users to create remotely stored profiles including personal data such as age, gender, schools attended, graduating class, places of employment, etc. The sites subsequently allow other users to search the foregoing criteria in an attempt to locate other users—be it to find a companion with similar interests or locate a long lost friend from high school. Users of the websites can specify friends and link friend pages to their site. Additionally, online gaming offers a similar functionality where users can play video games with each other on-line and specify a number of friends with whom they prefer to game, for example. A gaming service is provided to manage aspects of this environment and log data accordingly. Data can relate to on-line gaming instances, such as game played, time spent, communication level, high score, winner of the game, etc. Additionally the friend information can be stored to connect users via a social link.

Other websites, such as some retail shopping websites, offer the functionality of providing recommended products to users based on some algorithm. One type of algorithm is collaborative filtering which attempts to find items of interest for a user based on preferences of other users, the users are the world of users that utilize the website. As an example, a site can offer an additional item for sale based on what other users who bought the same original item as the current user subsequently bought. Another example is a social filtering algorithm that uses explicit social relationships between users to find items of interest.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A random walk over a graph having absorbing states is provided where the graph comprises a plurality of linked nodes; some nodes in the graph are absorbing such that the walk ends with these nodes. The graph can be, for example, an augmented bipartite graph where links are provided between nodes of different types but also can be provided between nodes of the same type. Additionally, parameters can be defined on the graph to influence the decisions at one or more steps. In one embodiment, an augmented bipartite graph can be created corresponding to a collaborative environment, such as a remote gaming platform. Data can be stored relating to the gaming, such as users of the platform and the games they own, as well as social links between the users. This data can be represented on an augmented bipartite graph comprised of a plurality of user and game nodes along with links representing ownership and friendship, for example. Starting at a user node for which a recommendation is desired, the graph can be randomly walked between linked nodes until a game node is traversed; the game node represents the recommendation to the user. In this regard, the recommendation is based on social relationships where the relationships can span beyond friendship to friend-of-a-friendship.

In one embodiment, the walk can be trained to provide more accurate recommendations; the walk starts at a user node and decides whether to next traverse a linked user node or a linked game/item node. This decision can be augmented by increasing the probability one way or the other. Additionally, a similarity can be calculated between users such that if user node is chosen for traversal, the choice of user node can be affected by the similarity calculation. For example, a more similar user can have a higher probability of being chosen. The walk can be trained by removing some of the provided ownership links and attempting to predict the removed links using optimal values for the parameters described above. When parameters are discovered that give the removed links a high probability of existence, the random walk can occur with the optimal parameters to produce good recommendations.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
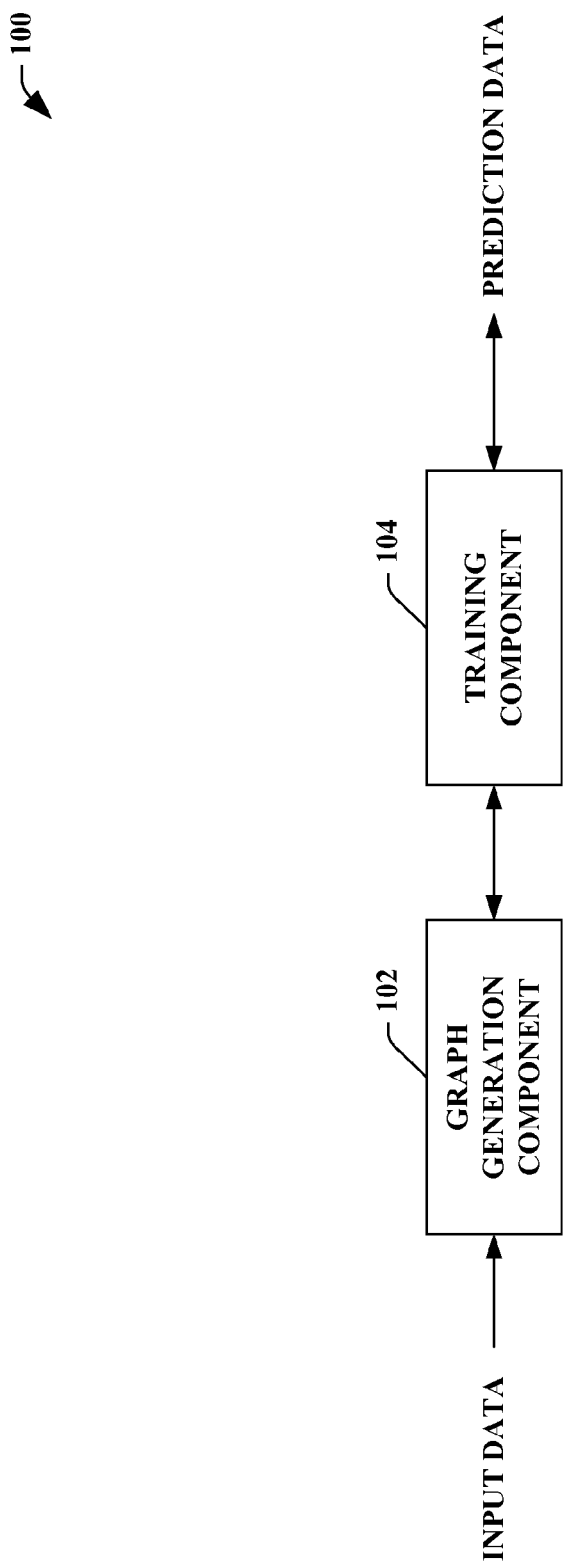
FIG. 1 illustrates a block diagram of an exemplary prediction architecture.

Automated recommendations are desirable in many contexts, such as on-line or in-store retail purchasing, television viewing, game/video rental selection, listening to or purchasing music, and the like. Such recommendations can be provided where data exists regarding preferences of other users as well as social links between the users. The preference information, for example, can be a rating given by a user, or more concretely, a indication of ownership. Various systems and methods described herein employ such ground truth to facilitate implementing recommendation functionality where a plurality of users and items are associated by graph (such as an augmented bipartite graph, for example); the graph is analyzed, manipulated, and trained to provide accurate recommendations which can be more accurate than cosine recommendation methods, for example. The graph can be substantially any graph having a plurality of linked nodes; an augmented bipartite graph is one such example where links can not only span between nodes of different types but also nodes of the same type in some instances—the graph is augmented in this regard. Additionally, however, the graph can be a 3-partite or k-partite having respectively 3 or k different types of nodes, for example. Furthermore, the graph can be a social network representative graph, etc.

In one embodiment, data regarding a plurality of users and items, for example, is translated to an augmented bipartite graph. The graph comprises a node for each user and item; links exist between items a user owns and also between users indicated as friends. In this regard, a random walk can be employed to traverse the graph, eventually arriving at an item related to a user that relates back to the starting point. In this way, the item nodes of the graph are absorbing such that one cannot move from item to user, only from user to user or user to item. This ensures the social connection between users that facilitates retrieving an accurate recommendation. Different parameters can be utilized in traversing the graph; for example, links can be given a weight such that a user prefers an item (and/or a user) over another. This weight can be used as a probability for moving about the graph. Additionally, a probability can be applied to whether to traverse a user link or an item link to ensure the recommendation does not move too far down the user chain or that the starting user does not keep getting recommendations from the same user, for example.

In another embodiment, by making the parameters dynamic, links can be temporarily removed from the graph, and the graph can be trained such to predict the links that were there. By doing this, optimal values can be found for the parameters, and a functional recommendation graph is created. The graph can subsequently be employed to provide recommendations. It is to be appreciated that this is not the only embodiment for training augmented bipartite graphs according to a random walk; rather this example will facilitate further discussion and analysis herein.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Now turning to the figures, FIG. 1 illustrates a system 100 that facilitates providing prediction data from a set of input data. A graph generation component 102 is shown that creates a graph and/or a representative matrix from a set of input data, as well as a training component 104 that can be utilized to train the graph to provide accurate or desired predictions, for example. In one embodiment, the graph generation component 102 receives the input data and creates an augmented bipartite graph having a two sets of related nodes and links between the nodes. Additionally or alternatively, the graph generation component 102 can create the transition matrix corresponding to the graph. The training component 104 can subsequently analyze the graph and/or matrix to find a balance of parameters that effectuate making good predictions and/or recommendations, which can subsequently be generated based on the input data.

In one embodiment, for example, the graph generation component 102 can take input data regarding shopping habits of a plurality of users as well as the users' relation to one another. For instance, a social network can comprise a number of individuals who are friends with one or more other individuals in the network; data regarding a certain category of purchases, such as electronic equipment, can also be provided. The graph generation component 102 can generate an augmented bipartite graph, for example, comprising nodes for each individual and for each electronic item (in a subset for example) owned by the individuals. The augmented bipartite graph can link individuals indicated as friends and link each individual to the electronic item(s) they own. The graph can provide directionality to links between individuals and electronic item nodes, the directionality points to the electronic item node. The directionality can, for example, indicate an absorbing property of the electronic item node. Additionally or alternatively, the graph generation component 102 can generate the transition matrix relating to the graph.

The training component 104 can subsequently utilize the graph to predict purchases or recommend purchases based on a random walk of the graph. A random walk constitutes starting at a node and moving to another connected node at random for a given number of steps. In this embodiment, the nodes relating to items on the graph can be absorbing such that the random walk can terminate at the absorbing node, and the prediction or recommendation is the item on which the walk ended. A probability p can be defined in this regard such that the walk can terminate at an absorbing node with probability p>0, and the walk can continue from the absorbing node with 1−p probability. In this embodiment, the walk can be configured or trained to only terminate at the absorbing nodes, however. In practice, this can be beneficial as the absorbing nodes can relate to a recommendation or prediction. It is to be appreciated that p can be 1 such that the walk always terminates when it steps to an absorbing node. The walk can be defined according to a number of steps, for example, in hope that the walk will terminate on an item link in the given number of steps or earlier. Thus, a prediction of purchase of one or more electronic items can be made by starting at the user for whom the prediction is to be made (this could also be a recommendation to the user, for example). A random walk can begin by moving from the user along a link to a friend of the user. From there, a decision can be made (via a probability, for example) to move along another user link or one or more item links. A weight can be given to the item links as well, corresponding to a chronology of purchase history and/or an importance or frequency of usage related to an item, for example. When the walk stops at an item, that is the predicted or recommended item.

To this end, the training component 104 can also utilize other parameters in conjunction with graph to provide more accurate output when randomly walking the graph such as a similarity between users. Parameters can be optimally tuned such that, for example, the probability of the user moving to a very similar friend (similar in regards to similarity in equipment owned) is very high as opposed to another friend. Additionally, a weight placed on an item by the friend for an item not owned by the user can indicate that is the next piece of equipment the user will buy (or a recommendation can be made to that effect). In the real world, the similarities of equipment can be the result of the friends constantly communicating about electronics and recommending equipment to each other. The importance placed by the friend on the equipment can represent the extent to which that equipment is discussed in conversation (e.g. how wonderful it is), which represents the influence over the decision of the user, and thus, the prediction that the user will purchase the equipment at some point. In a recommendation implementation, the equipment can be recommended to the user, for example, where the friend holds the equipment in high regard, but the two do not talk about electronics so much (this lack of discussion might be manifested in the graph showing that the two friends do not own very similar equipment, for example).

Figure 2:
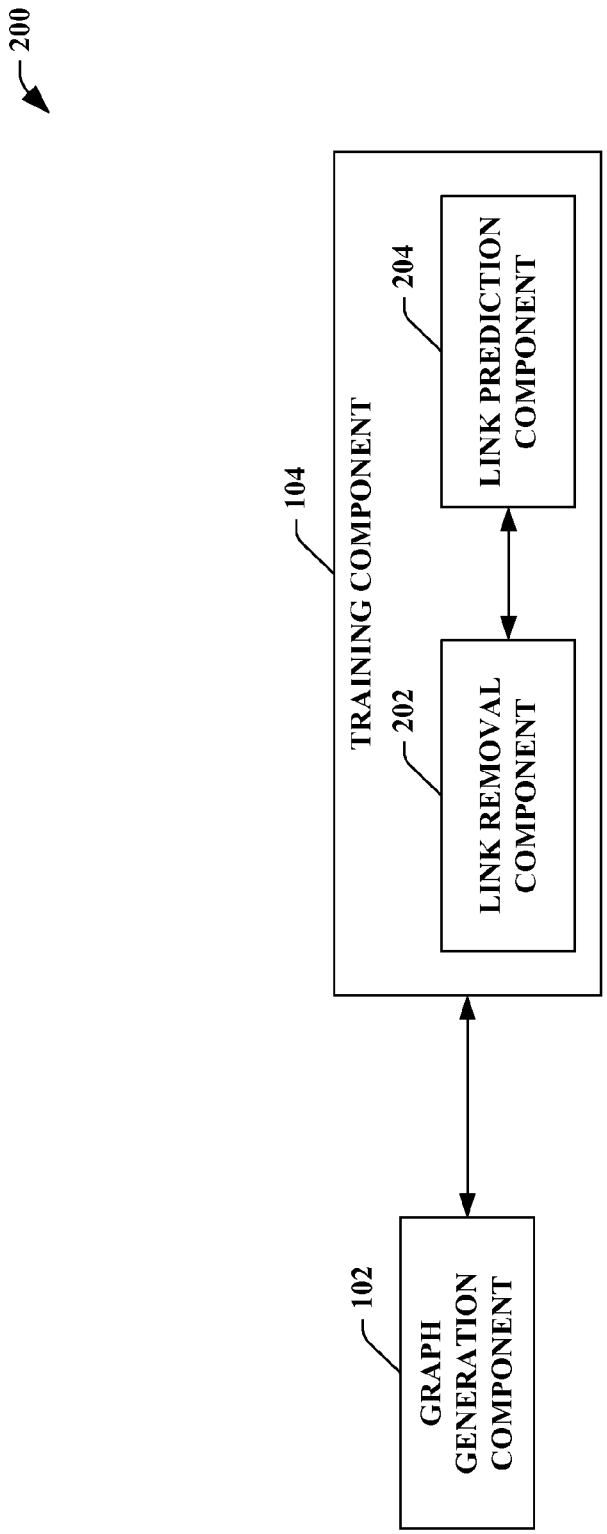
FIG. 2 illustrates a block diagram of an exemplary graph training architecture.

Referring to FIG. 2, an example system 200 that facilitates training a graph representative of linked data is illustrated. A graph generation component 102 is provided that can, for example, generate a graph based at least in part on a set of input data; the data can correspond to different categories of data and relations within the data and/or categories, for example. A training component 104 is also provided to train the graph (or other components utilizing the graph, for instance); the training component 104 comprises a link removal component 202 that can remove links in the graph that represent data relations and a link prediction component 204 that can adjust parameters of the training component to predict the removed links. In this regard, the graph can be tuned to provide optimal recommendations and/or predictions based on the input data. In one embodiment, the graph generation component 102 creates a graph and/or a representative transition matrix, and the training component 104 trains the graph by utilizing the link removal component 202 to remove one or more links and a link prediction component 204 to predict the removed links based on other parameters.

For example, the training component 104 can analyze the graph generated by the graph generation component 102 using a random walk, where starting at a node, the graph can be traversed randomly from one node to the next through a connecting link. It is to be appreciated that one or more sets of nodes can be absorbing such that the walk can terminate (as described supra, according to a probability, for example) when such a node is traversed. Nodes can be of different types as mentioned, for example a set of nodes can be provided corresponding to a set of n users and another set corresponding to m items which relate to the n users. Links can be made where relationships occur; links exist between users, as well as from users to items. However, links typically are not provided in this embodiment between items. To traverse the graph beginning at a user, a connected node is selected at random—possibilities can include one or more linked users and/or one or more linked items. The probability of selecting the next node at random, for example, is 1 out of the number of linked items by default. However, weights can be applied to links and/or to the type of node to be selected such that certain nodes are more likely to be traversed than other nodes.

In one embodiment, the generated graph can represent music collections of a plurality of users. The graph can be augmented bipartite, for example, having a column of nodes for each user and a column of nodes for each album and/or song track in the users' collective collections (or a subset of commonly owned albums and/or song tracks, for example). Additionally, links can be provided from users to their albums and also from user to user to indicate friends and/or similar users (similar in regard to collection, for example). The training component 104 can subsequently utilize the graph to perform random walks providing recommendations and/or predictions regarding the data. Additionally, the training component 104 can utilize the graph to fine tune (or train) parameters about the graph. For example, in a recommendation system for music as described, a weighted probability can be assigned to each link leaving a node, for example, corresponding to whether to move to a linked user node or a linked item node.

In one embodiment, for example, the probability of moving to a user node can be defined as α, and the probability of moving to an item as 1−α. In one embodiment, α is defined constant throughout a walk for a given user. It is to be appreciated that α can also be constant for each walk and/or change at each step in the walk. Moreover, weights can be provided both to users (with respect to similarity to a connected user) as well as music items (relating to a user's ranking of the item, for example). The weight relating to similarity between users can be determined, for example, based on similarity in music collection. In this embodiment, the weight only needs to be determined with respect to already linked users (users indicated as friends, for instance). The similarity can be determined by a number of formulas and/or specified by a user or another component; one example formula for determining similarity between a user u and a user v can be the following:

$$sim(u, v) = \frac{\text{\# games in common between } u \text{ and } v}{\sqrt{\text{\# games owned by } u} \ \sqrt{\text{\# games owned by } v}}$$

Once the similarity weights are added to the links, a parameter β can be defined to represent the effect of the similarity weight. Thus, if β=0, all users have an equal chance of being the next node regardless of similarity if user node is chosen for traversal over item node; whereas as β→∞, the most similar user becomes more and more likely to be selected.

After the weights have been defined, the training component 104 can begin training the graph by removing some of the links via the link removal component 202, which can be but are not limited to the links between users and music items. With a portion of the links removed, the link prediction component 204 can attempt to predict the links that were temporarily removed by choosing values for α and β that give high probabilities to the removed links; it is in this way that the parameters are learned for subsequently randomly walking the graph (such as to provide recommendations, for example). It is to be appreciated that the α and β can be found using a grid search, numerical optimization techniques (such as numerical gradient techniques, for example), and/or the like. When the optimum values for α and β are defined, the training component 104 (or another component) can provide substantially accurate recommendations (or predictions) by doing a random walk on the trained graph.

Figure 3:
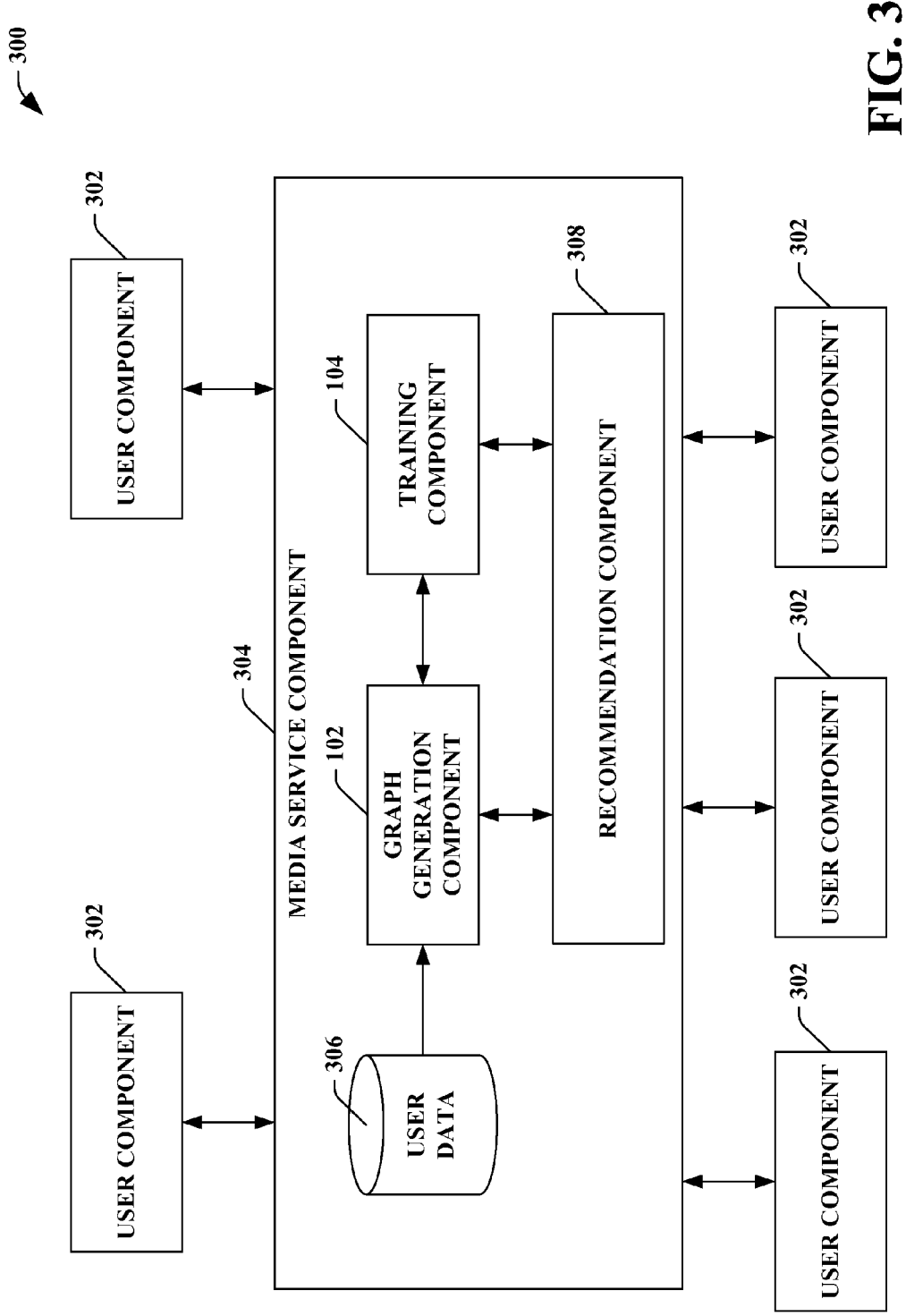
FIG. 3 illustrates a block diagram of an exemplary platform that facilitates recommending media items.

Turning now to FIG. 3, a system 300 is illustrated that facilitates recommending media items. A plurality of user components 302 are provided that are communicatively coupled to a media service component 304. It is to be appreciated that the user components 302 can be coupled by any wired or wireless network medium, including the Internet, WiFi, Bluetooth, local area network (LAN), wide area network (WAN), etc. The media service component 304 can serve and/or track media content with respect to the user components 302; the media service component 304 comprises a graph generation component 102 that takes user data 306 as input, the user data 306 is related to the media content available to one or more of the user components 302. The graph generation component 102 can generate a graph and/or a matrix related to the user data 306, and a training component 104 is provided that can, for example, train a provided recommendation component 308 on formulas, methods, and/or values for walking the graph and/or matrix. The recommendation component 308 performs such analysis of the graph upon request for recommendation. The request can initiate from a user component 302 or other source (such as an advertisement system and the like).

In one embodiment, the media service component 304 can be a music store, for example, that houses a plurality of digitally stored music tracks available for download to the user components 302. It is to be appreciated that the downloads can require purchase such that the media service component 304 can also manage licensing of the music. The licensing information can be stored in user data 306 for example, and give the media service component 304 access to valuable data concerning song choices of its user components 302, for example. Moreover, the media service component 304 can allow user components 302 to share music when in proximity, for example, and data regarding such sharing can be kept in the user data 306 as well in attempt to identify users who are "friends" or at least have similar music tastes (such that sharing music between themselves is desirable). In this regard, a graph and/or representative transition matrix, for example, can be created relating to the user data 306. In one embodiment, an augmented bipartite graph is created having a set of nodes related to the users and a set related the collectively owned music tracks. Links of the graph can relate to ownership such that users are connected to the music tracks they own; additionally, links can be provided between users based on the friend or shared playlist usage information as described. In another embodiment, there can be no central service and the user components 302 are interconnected (such as socially linked in a social network) as user nodes. The walk in this embodiment can begin from a user component 302 passing a message to socially connected user components 302 until the message is absorbed as described above. When the message is absorbed, the recommendation, prediction, or message is sent back the beginning user component 302.

The training component 104 can train the recommendation component 308 on how to walk the graph to provide recommendations to user components 302. For example, a random walk can be used by the recommendation component 308 such that starting at a user node, the walk can continue at each step to any nodes connected to the previous node. Additionally, the music track nodes of the graph can be absorbing such that the walk ends at those nodes—e.g. movement from a music track to any other node (such as a connected user node) is forbidden. As described supra, and as will be described in greater detail infra, the graph can be traversed according to additional parameters that affect movement about the graph at the different nodes. For example, choosing which node to walk to is typically done at random; however, parameters can be provided to add weight and/or probabilities to the walking decisions. One such probability is choosing whether to initially traverse a user node or a music track node. As described supra, this probability can be fixed throughout the walk for a given user and/or instance of the walk, for example. Another probability can relate to similarity between users; in one embodiment, similarities can be determined between linked user nodes, for example, based on music track ownership similarities. The parameter can then relate to how much weight to give the similarity rating between users—a 0 weight can represent a completely random distribution and as the weight gets greater, the likelihood of selecting a similar user from the linked nodes becomes higher. It is to be appreciated that these are just two of a substantially limitless number of parameters that can be employed.

The parameters can be used by training component 104 to train the recommendation component 308 for choosing recommendations by performing a random walk on the graph and/or matrix, for example, to arrive at a good recommendation. Formulas, methods, and processes will be described herein relating to various examples of how to train the recommendation component to walk the graph finding good recommendations. An embodiment includes finding good values for the aforementioned parameters by removing some links in the graph and attempting to predict those links. Once the values are determined, walks can be performed on the graph utilizing the parameters to provide a recommendation of a music track to a user. In this regard, the recommendation can come from a user that is socially connected to the user, the recommending user can be chosen based on a similarity probability for example. The recommending component 308 can receive a recommendation request from a user component 302, or another component for example. The recommending component 308 can walk the graph starting at the user node for which the recommendation is requested. Using the parameters, the graph can be walked until a music track node is reached and/or walked for a given number of steps.

In another embodiment, the media service component 304 can be a video game console collaboration system. The media service component 304 can provide a plurality of user components 302 (or video game consoles, for example) with access to a wealth of collaborative functionality. For example, the media service component 304 can provide head-to-head game play between two or more consoles, the game play can provide for communication between the parties as well. To this end, users of the consoles can specify friend consoles to which they extend the head-to-head play invitation; moreover, the media service component 304 can allow one or more consoles to leave discussion information, such as trash talk, notes, reminders, etc. to other consoles. Additionally, the media service component 304 can allow consoles to download game demos, extensions, other media content, and the like from a centralized server, for example. Many more functionalities can be offered by the media service component 304, and substantially all data regarding the functionalities can be stored in the user data 306, such as a given user's friends, games owned, games downloaded, games viewed, high scores, messages sent, reminders sent, and the like.

In this embodiment, a graph can be generated by the graph generation component 102 that represents a set of data; for example, the graph can be an augmented bipartite graph representing a set of user nodes and a set of game nodes that relate to the collective games owned by the users. Links can be provided from a given user to the games they own; the links can have a direction to indicate an absorbing property of the game nodes. Additional links can be provided between users relating to the friend information such that a social connection can be established for subsequent graph traversal. It is to be appreciated that a matrix can be provided in addition or alternatively; the matrix relates to the nodes and links. Utilizing the graph, the recommendation component 308 can make recommendations to user components 302 (or consoles, for example) for games based on connected users. In one embodiment, this is done by a random walk of the graph created by the graph generation component 102, where the walk starts at the user node for which the recommendation is requested. The walk continues to a connected node, be it another user or a game; the decision can be random and/or assigned a weight or probability as further described herein. The next step can move to another connected node and so on until an absorbing node (any game node in this embodiment) is hit; at this point, the walk terminates. Typically, no movement can occur from an absorbing node and in this embodiment, all game nodes are absorbing. Thus, once a game node is hit, the walk is over, and that node is the result of the walk. As mentioned, and as will be described, a training component 104 can train the recommendation component 308 to walk the graph according to different parameters. For example, the random walk can comprise the following steps starting at a user node: 1) choose whether to move to a user node or an item node; 2) if user, choose which user; 3) else, choose which item. Thus, parameters can be used to weigh the foregoing decisions; a weight can be assigned to the first decision such that the probability of choosing a node of one type is $\alpha$, and the probability of choosing another if $1-\alpha$. It is to be appreciated that in other graphs, such as a 3- or k-partite graph for example, the probabilities can be defined according to more than the two values shown (such as $\alpha$, $\beta$, and $1-(\alpha+\beta)$ where $(\alpha+\beta)<1$ in a 3-partite graph). Additionally, the decision of which user to choose can be weighted to attempt similar users first, etc. Also, the decision of which game to choose can be weighted (based on the owning user's preference for the game, for example). In this regard, recommendations come only from connected users and not just a collaborative filter of all users.

It is to be appreciated that there can be users included that are not linked to any other users in the graph; in this case, alternative recommendation techniques (such as cosine similarity, for example) can be used, the user can be linked to every other user, and/or other users can be picked at random and artificial social links can be created to connect the lone user with the k users having a similar set of items (games), for example.

Figure 4:
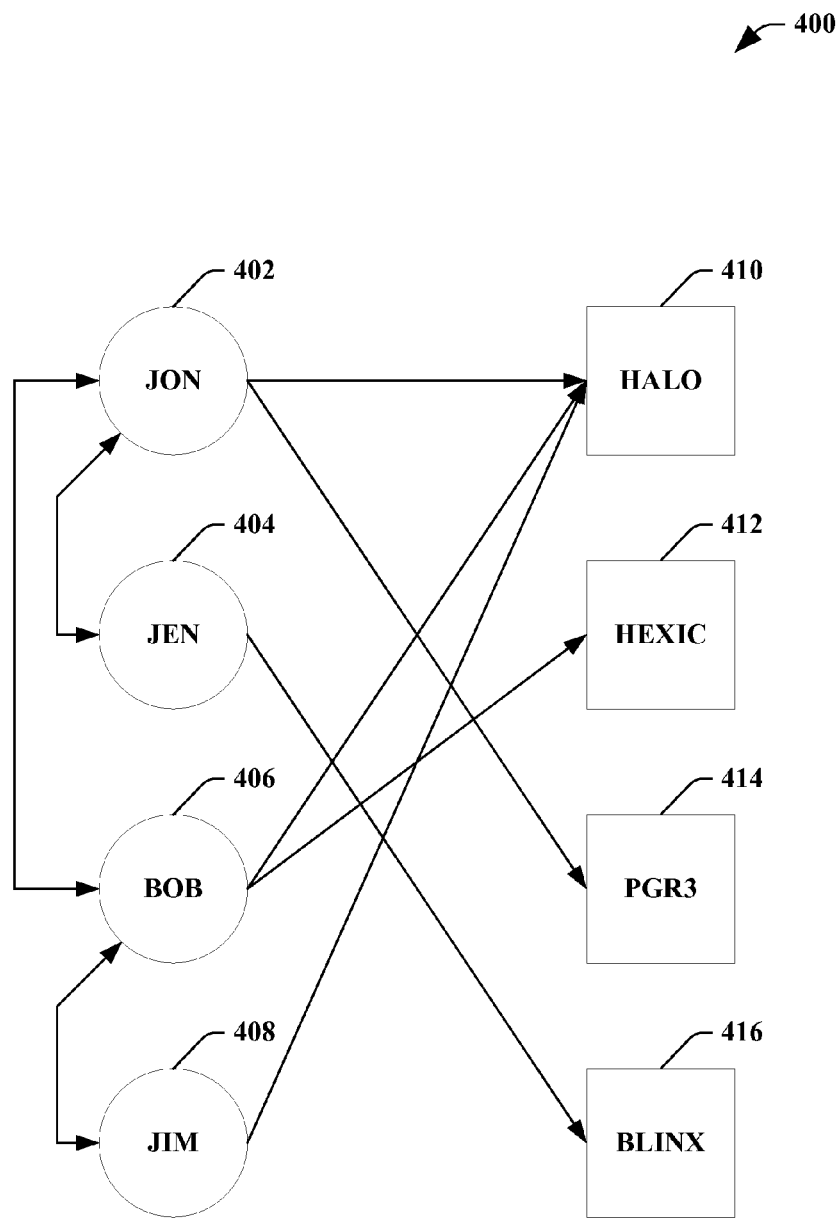
FIG. 4 illustrates a block diagram of an exemplary augmented bipartite graph.

Referring to FIG. 4, an example augmented bipartite graph 400 in accordance with the subject matter described herein is shown. The graph provides a series of nodes related to users, Jon 402, Jen 404, Bob 406, and Jim 408, as well as nodes related to video games, Halo 410, Hexic 412, PGR3 414, and Blinx 416. Additionally, links are provided between users, indicated as friends for example, as well as between user and video game. For example, Jon 402 is friends with Jen 404 and Bob 406; additionally, Jon 402 owns Halo 410 and PGR3 414. In accordance with one or more embodiments described, the video game nodes can be absorbing such that a random walk over the graph 400 would terminate at a video game node. A random walk can be performed on the graph as described in other embodiments to obtain a recommendation and/or prediction with respect to a user. For example, starting a Jon 402, the walk can move to Jen 404, Bob 406, Halo 210, or PGR3 414 since those are the only linked nodes. If the walk moves to Halo 210 or PGR3 414, the walk is over since these are absorbing nodes (represented as squares in this example). If the walk moves to Jen 404, the next step can be to Blinx 416, which would terminate the walk giving the recommendation, or back to Jon 402. If the walk moves to Bob 406, the next step can be to Halo 410, Hexic 412, Jim 408, or back to Jon 402. The walk can continue for a given number of steps and/or until it hits an absorbing node to render a recommended video game for the starting user node. In a simple example, a coin can be flipped to determine whether a user node or video game node shall be traversed. With weights being equal for all nodes, a representative probability transition matrix, P, can look like the following:

$$P = \begin{pmatrix} & \text{Jon} & \text{Jen} & \text{Bob} & \text{Jim} & \text{Halo} & \text{Hexic} & \text{PGR3} & \text{Blinx} \\ \text{Jon} & & \frac{1}{2}\cdot\frac{1}{2} & \frac{1}{2}\cdot\frac{1}{2} & & \frac{1}{2}\cdot\frac{1}{2} & & \frac{1}{2}\cdot\frac{1}{2} & \\ \text{Jen} & \frac{1}{2} & & & & & & & \frac{1}{2} \\ \text{Bob} & \frac{1}{2}\cdot\frac{1}{2} & & & \frac{1}{2}\cdot\frac{1}{2} & \frac{1}{2}\cdot\frac{1}{2} & \frac{1}{2}\cdot\frac{1}{2} & & \\ \text{Jim} & & & \frac{1}{2} & & & \frac{1}{2} & & \\ \text{Halo} & & & & & 1 & & & \\ \text{Hexic} & & & & & & 1 & & \\ \text{PGR3} & & & & & & & 1 & \\ \text{Blinx} & & & & & & & & 1 \end{pmatrix}$$

This shows the probability of moving from one node to any other node in the graph. Since the game nodes are absorbing, their probability is 1 because the walk ends with them. For example, moving from Bob 406 to Halo 410 is a $$\frac{1}{2}\cdot\frac{1}{2} \left(\text{or } \frac{1}{4}\right)$$

chance. This is because from Bob 406 there is a 1 in 2 chance of flipping tails to choose a video game node and another 1 in 2 chance of choosing Halo 410 over Hexic 412.

This matrix represents single steps; however, it is to be appreciated that this matrix can be multiplied by itself P times to get the probabilities for P steps. For example, the probability of getting from Jim 408 to Hexic 412 in at most 3 friend steps is contained in the cell in the row corresponding to Jim and the column corresponding to Hexic in $P^4$. The 4 steps are one of:

1. An initial user-game ownership link step to Hexic 412 and then 3 steps from Hexic 412 to itself. Since Jim does not own Hexic, there are no such paths in the example above.
2. A user-user friendship link step, a user-game ownership link step, then 2 steps from Hexic 412 to itself (one friend step). There is one such path from Jim 408 to Hexic 412 in the example (through Bob 406).
3. Two user-user friendship steps, a user-game ownership link step, then a step from Hexic 412 to itself (two friend steps). There are no such paths in the example leading from Jim 408 to Hexic 412.
4. Three user-user friendship steps and a user-game ownership step. There are two such paths in the example.

The row corresponding to a user in the limit of $P^n$ as $n \to \infty$ gives the probabilities of getting from that user to each game in any number of steps. A training component for a recommendation system (shown in previous figures) for example, can use these probabilities as strengths of recommendations for each game that a user does not own. Thus, an un-owned game with the highest probability can be the strongest recommendation, and so on down the list of all un-owned games for a user sorted by these probabilities. It is possible, in some cases, that an infinite limit cannot be taken; in these cases $P^n$ can be used with n as high as computationally tractable. Additionally, standard sparse matrix techniques can be used to only store non-zero elements of these very sparse matrices, and only store the rows corresponding to users for efficiency purposes, for example.

The examples provided above utilize an equal probability for selecting user versus video game; once one is selected, again the probability is equal for the next item. For example, if a user has 4 friends, the chance is 1 in 2 that the walk picks to go to a friend over a video game and then 1 in 4 that it picks a given friend. However, these probabilities can be weighted to provide for better walks according to recommending games. For example, for the first move in the walk, the probability of choosing a user over a video game can be very high, or even 1, to ensure the walk does not stop at a game the user currently owns. However, after a friend is chosen, the probability of choosing another friend or a game can be weighted down so that it is possible to choose a game of the current friend user. Thus, such a parameter can be defined, as shown above, as $\alpha$, where $\alpha$ represents the probability of choosing a user node and $1-\alpha$ represents choosing a game node. Thus, for the first move, $\alpha$ can be 1, for example, to ensure the user goes to another user node, but for subsequent moves, a lower probability can be desired. It is to be appreciated that other than mere recommendations, the subject matter as disclosed can provide a ranking of a subset of items based on probabilities of arriving at those items. In this case, a high value for $\alpha$ is not necessary as a first step as the items the user already owns can rank substantially higher than other items, and can thus be deleted from the ranking list. In one embodiment, a stationary distribution can be computed and/or approximated by utilizing the transition matrix (P shown above, for example) and a learned probability parameter (such as $\alpha$ and $\beta$ described above, for example). The stationary distribution (or other distributions disclosed herein) can be used to recommend items and/or provide a static rank/score related to items (such as in a web search, for example).

Additionally, some friends of a user are going to be more similar, especially in regard to game selection. Accordingly, a similarity weight can be given to each link between users that can be defined by substantially any similarity algorithm. An example of one based strictly on game ownership can be the following:

$$sim(u, v) = \frac{\text{\# games in common between } u \text{ and } v}{\sqrt{\text{\# games owned by } u} \sqrt{\text{\# games owned by } v}}$$

Thus, similarities in the graph 400 can be shown by the following matrix, for example:

$$\begin{pmatrix} & \text{Jon} & \text{Jen} & \text{Bob} & \text{Jim} \\ \text{Jon} & & 0 & \frac{1}{2} & \\ \text{Jen} & 0 & & & \\ \text{Bob} & \frac{1}{2} & & & \frac{1}{\sqrt{2}} \\ \text{Jim} & & & \frac{1}{\sqrt{2}} & \end{pmatrix}$$

Once the similarity weights are given to each link, another parameter, $\beta$, can be defined to represent the likelihood of preferring a link by weight. For example, if, $\beta=0$, all users have an equal chance of being the next node regardless of similarity; whereas as $\beta \to \infty$, the most similar user becomes more and more likely to be selected. In another embodiment, a probability can be assigned to each link (which can act as a weight, for example). A formula can be given to determine appropriate probabilities based on similarity. One possible formula is the following:

$$p(v|u) = \frac{e^{\beta sim(u,v)}}{\sum v \in \text{friends}(u) e^{\beta sim(u,v)}}$$

Where $sim(u,v)$ measures the similarity of the current user u and the friend v, which can be done using the $sim(u,v)$ algorithm above though other algorithms are possible, friends(u) is the vector of friends for u, and $\beta$, as mentioned, is the parameter for determining bias of the choice of friend. It is to be appreciated that similarity, and therefore probability, only need to be determined where friend links exist; thus, the cost is less than on the order of $O(n^2)$ unless all users are friends with every other user. Additionally, other algorithms can be employed to produce an even less amount of similarity valuations, for example a requisite amount of similar games can be required before the similarity is determined by calculation. This can work well in this embodiment as a number of users can have the same game, for example, if it came with the console system—this obviously does not mean the users are similar at all.

Utilizing variables $\alpha$ and $\beta$, as shown supra, a transition matrix $P(\alpha,\beta)$ can be determined as a function of $\alpha$ and $\beta$. According to the examples above, such a matrix can be represented as follows:

$$P(\alpha, \beta) = \begin{pmatrix} & \text{Jon} & \text{Jen} & \text{Bob} & \text{Jim} & \text{Halo} & \text{Hexic} & \text{PGR3} & \text{Blinx} \\ \text{Jon} & & \frac{\alpha}{1+e^{\frac{\beta}{2}}} & \frac{\alpha e^{\frac{\beta}{2}}}{1+e^{\frac{\beta}{2}}} & & \frac{1-\alpha}{2} & & \frac{1-\alpha}{2} & \\ \text{Jen} & \alpha & & & & & & & 1-\alpha \\ \text{Bob} & \frac{\alpha e^{\frac{\beta}{2}}}{e^{\frac{\beta}{2}}+e^{\frac{\beta}{\sqrt{2}}}} & & & \frac{\alpha e^{\frac{\beta}{\sqrt{2}}}}{e^{\frac{\beta}{2}}+e^{\frac{\beta}{\sqrt{2}}}} & \frac{1-\alpha}{2} & \frac{1-\alpha}{2} & & \\ \text{Jim} & & & \alpha & & 1-\alpha & & & \\ \text{Halo} & & & & & 1 & & & \\ \text{Hexic} & & & & & & 1 & & \\ \text{PGR3} & & & & & & & 1 & \\ \text{Blinx} & & & & & & & & 1 \end{pmatrix}$$

Thus, $\lim_{n \to \infty} P^n(\alpha, \beta)$, and therefore the recommendations in this example, are functions of α and β. With this in mind, a training component (as shown in previous figures), for example, can attempt to pick values for α and β that give good recommendations. As described supra, this can be accomplished by removing links in the graph—likely the links corresponding to ownership in this example—which can be referred to as training links. Subsequently, the training component or other component executing a training algorithm, for example, can find values for α and β that give high probabilities to the existence of the removed links. In this regard, the values relate to real decisions that have been made regarding purchases based on purchases of friends, and subsequently, good recommendations can be made by using this information to do a learned absorbing random walk on the augmented bipartite graph (such as graph 400). It is to be appreciated that α and β, as shown above, are not the only two parameters that can be defined; rather these are just a couple of parameters that can facilitate training a graph to produce more accurate results than mere collaborative filtering or social network algorithms.

One example of training the graph to find good values for α and β such to restore the training links is by defining the absorption probability p(g|u) of the game g for the user u as:

$$p(g \mid u; \alpha, \beta) = \lim_{n \to \infty} p_{ug}^n(\alpha, \beta)$$

where $p_{ug}^n$ is the element in the $u^{th}$ row and the $v^{th}$ column of $P^n(\alpha,\beta)$. Then, α and β can be found to maximize $$\prod_i p(g_i \mid u_i; \alpha, \beta)$$

where $u_i$ and $g_i$ can be the user and game of the $i^{th}$ training link, and the prediction probabilities can be computed from the graph that does not include training links. As described previously, α and β can be found using grid search, numerical optimization techniques (such as numerical gradient techniques, for example), etc. In one embodiment, an absorption probability matrix can be determined, and a list of recommendations/predictions can be provided to a user as a subset of reachable nodes from the user where the nodes are ranked according to absorption probability.

Using the above example as well, costs of different steps can be computed. For example, a hitting time for each node can be calculated; the hitting time refers to the average number of steps a random walker would take on a graph to get from u to g. The formula relating to the above examples can be the following:

$$H_{ug}(\alpha, \beta) = \sum_{n:u \to g} p(\pi; \alpha, \beta) l(\pi)$$

where π ranges over all paths in the graph (such as graph 400) from u to g, p(π;α,β) can be the probability of taking path π from node n, and l(π) can be the length or number of steps in the path π. For example, in the graph 400 pursuant to the examples given supra, when α=0.5 and β=0.5, the hitting time from Jim 408 to Hexic 412 can be given by:

$$H_{Jim,Hexic}(0.5, 0.5) =$$

$$\left(\frac{1}{2}\right)\left(\frac{1}{4}\right)(2) + \left(\frac{1}{2}\right)\left(\frac{1}{4}\right)\left(\frac{1}{2}\right)\left(\frac{1}{4}\right)(4) + \left(\frac{1}{2}\right)\left(\frac{1}{4}\right)\left(\frac{1}{4}\right)\left(\frac{1}{4}\right)(4) + \dots$$

according to the above formula. The values relate to some of the possible paths of varying lengths and probabilities associated therewith (Jim 408, Bob 406, Hexic 412), (Jim 408, Bob 406, Jim 408, Bob 406, Hexic 412), (Jim 408, Bob 406, Jon 402, Bob 406, Hexic 412), and so on. Additionally, an expected commute time between nodes can be computed using the aforementioned formulas as the average number of steps it takes to get from u to g and back. The formula can be like the following:

$$C_{ug}(\alpha,\beta) = H_{ug}(\alpha,\beta) + H_{gu}(\alpha,\beta)$$

It is to be appreciated that where g is a game node, as in the above examples, the commute time is infinite as the node is absorbing; however, if g is a user node such as in graph 400, the commute time can be computed between users. Because both formulas are essentially infinite as paths from a user u to a game g can go on forever, the hitting time and expected commute time can be approximated by truncating that sum as there becomes a point where the numbers to add become infinitely small as to be rendered negligible. Additionally, other parameters can be calculated and defined such as the absorption probability as defined above, and/or substantially any cost function of the training links. Aside from being just cost calculations, the foregoing formulas can be used to train a graph to choose values of α and β that minimize hitting time, for example, as opposed to (or in conjunction with) maximizing prediction probabilities as shown above.

Furthermore, costs can optimize the training process by utilizing a variable training mode; the variable mode provides for both maximizing prediction probabilities (as described above) and minimizing hitting time (as described below). The squared hitting time cost function:

$$H_{ug}^2(\alpha, \beta) = \sum_{n:u \to g} p(\pi; \alpha, \beta) l^2(\pi)$$

can be used to penalize recommendations from more distant social contacts more severely than hitting time, for example. Additionally, the novelty of a recommendation can be measured using various methods. For example, the Shannon information $$\left(\log \frac{1}{p(g)}\right)$$

can be used where p(g) is the proportion of users that own g. It is to be appreciated that this proportion can relate to the games owned by all users and/or any combination, such as the starting user's friends, etc. A game owned by all users in the group can have a novelty of 0, and a game owned by only one user can have information log(# users). Thus, a training component (shown in previous figures) can be trained and/or train a graph to recommend novel games by maximizing the expected information:

$$I_{ug}(\alpha, \beta) = \sum_{n:u \to g} p(\pi; \alpha, \beta) \log\left(\frac{1}{p(g)}\right).$$

The subject matter as described can also be monetized such that selling a recommended game g generates profit r(g), which can be different for each game. Therefore, to maximize profit, a training algorithm is provided as:

$$R_{ug}(\alpha, \beta) = \sum_{n:u \to g} p(\pi; \alpha, \beta) r(g).$$

It is to be appreciated that many other algorithms and/or methods can be used to train one or more components according to the subject matter as described such that the training affects the recommendation and/or rating list provided to a user. For example, costs of paths can also depend on certain properties of the links as well.

Figure 5:
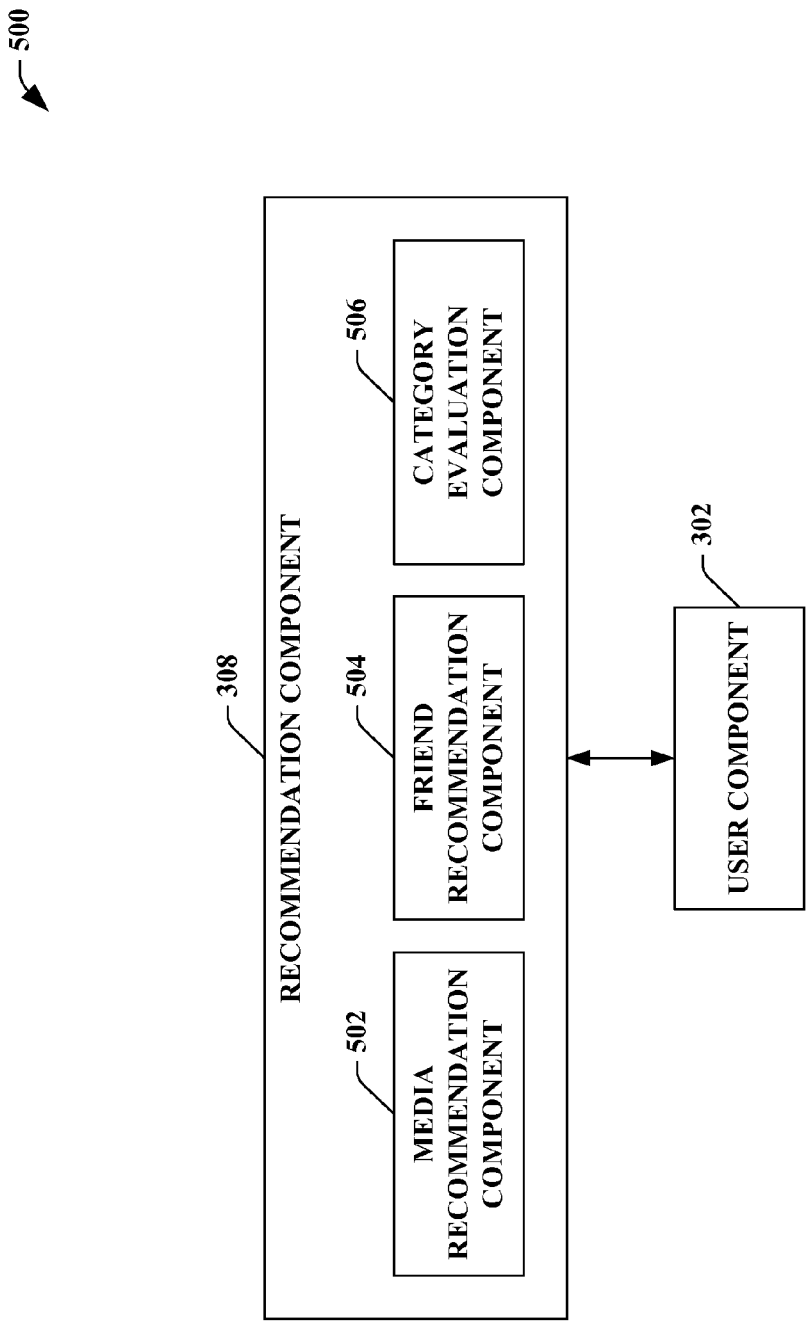
FIG. 5 illustrates a block diagram of an exemplary recommendation component.

Turning now to FIG. 5, a system 500 that facilitates recommending items is illustrated. A user component 302 is provided that can receive a recommendation from a recommendation component 308 with respect to media, documents, financial information, retail purchasing, and/or substantially any information where other users perspectives can be utilized to provide recommendations and/or predictions, for example. The recommendation component 308 comprises an item recommendation component 502 that recommends items to a user component 302, a friend recommendation component 504 that recommends friends to the user component 302 (which can be based on item similarity information, for example), and a category evaluation component 506 that can categorize a user's preferences and utilize this information to categorize recommendations to the user.

In one embodiment, a user component 302 receives a recommendation for an item from the item recommendation component 502; this can occur using many different methods and components such as shown above. The recommendation can be based on, for example, data regarding other user's items as well as social links between the user component 302 (or a user thereof, for example), and the other users. It is to be appreciated that the recommendation component 308 can send a recommendation to a user component 302 based on a request from the user component 302 or another component, such as an advertising component and the like, for example.

In another embodiment, the user component 302 can receive a recommendation from the friend recommendation component 504. This recommendation can relate to one or more users (or user components 302) of a platform or system of which the recommendation component 304 is a part; the users recommended can have similar items as the user for which the recommendation is being requested, for example. Additionally, the user(s) recommended can have similar item recommendation lists as the user for which the recommendation is being given. In one embodiment, an augmented bipartite graph can be provided as shown above, and a recommendation for a playing partner (or "friend") can be desired for a user component 302. To this end, a walk can begin at a random user or a friend of a friend, for example. Starting from the random user, recommendations can be evaluated as shown above, and the recommendation list can be compared to the user for whom the recommendation is sought, for example. A threshold can be set and if the recommendation lists are of a threshold similarity, the user can be recommended as a friend by the recommendation component 504; if the threshold is not met, another random user can be tried. It is to be appreciated that learning can be involved in this scenario as well to create caches of users for certain games and the like. Moreover, a reverse walk of the graph can be performed to arrive at users who at least own a similar game. For example, if a recommendation for a given game is desired, the walk can begin at the user, move to the game desired and to a random user from there for evaluation of similarity. Additionally, the friend recommendation component 504 can recommend friends by creating the recommendation list, ranking at least a subset of the recommendations according to probability, along with the user from whom the recommendation came. The top users who are not directly connected to the user for whom the recommendation was requested can be recommended as new friends or remote gaming partners, for example.

In another embodiment, a category evaluation component 506 can allow categorical preferences to affect recommendation decisions. For example, in the video game context, following a list of recommendations being generated for a user component 302, the category evaluation component 506 can tailor the list according to preferred game categories of the user. Thus, if the user component 302 prefers first game shooters to sports games, if the recommendation list comes back ranked according to probability of reaching the game node and a sport game is ranked above a first person shooter, the category evaluation component 506 can switch the entries. It is to be appreciated that the category preferences can be specified by the user (or user component 302, for example), a separate component, or determined automatically using rankings, probabilities, analysis heuristics and/or artificial intelligence, for example. Additionally, the categories can be employed as a parameter to utilize in training the recommendation component 308 to perform a random walk on the augmented bipartite graph. For example, the category preference can be utilized to add weight to certain links, change a parameter according to weighting the links, and/or introduce certain links (such as item links, for example). Moreover, the preference can be used in determining similarity between users in accordance with embodiments described supra.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 6:
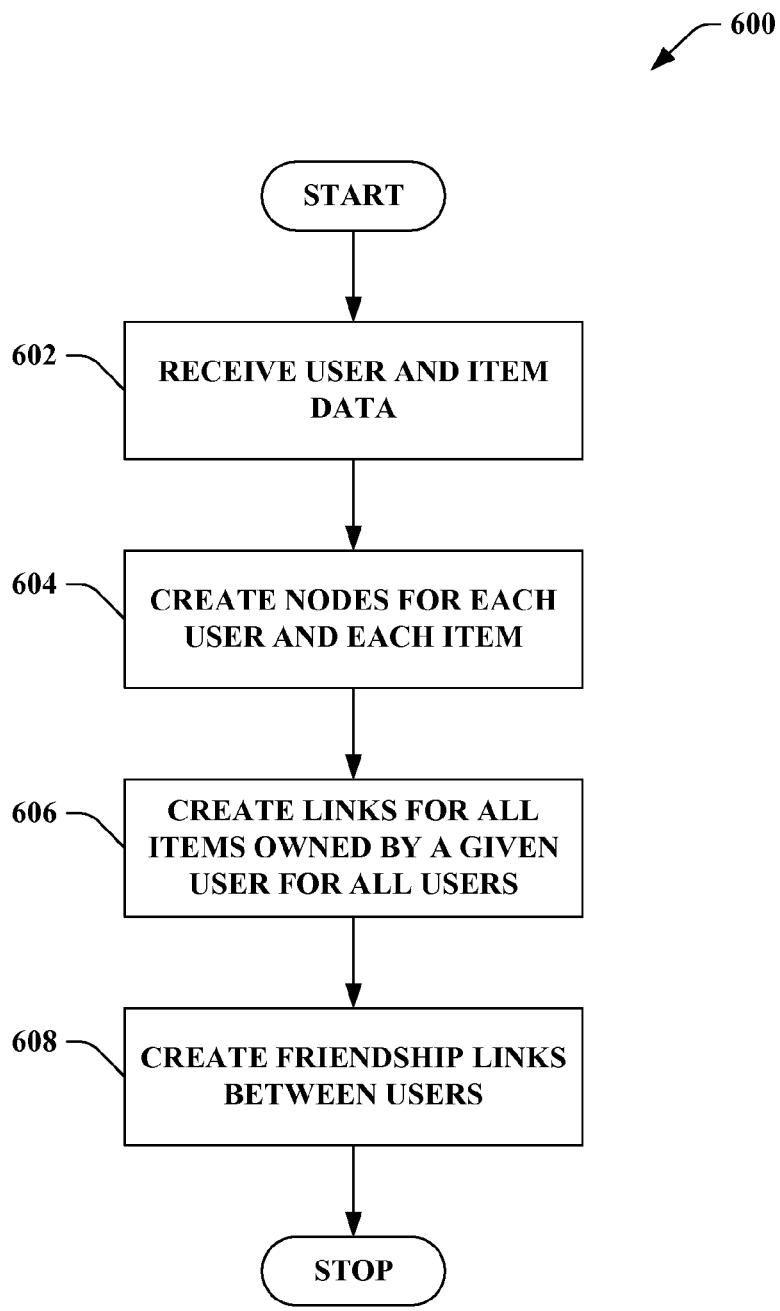
FIG. 6 illustrates an exemplary flow chart for creating an augmented bipartite graph.
Figure 7:
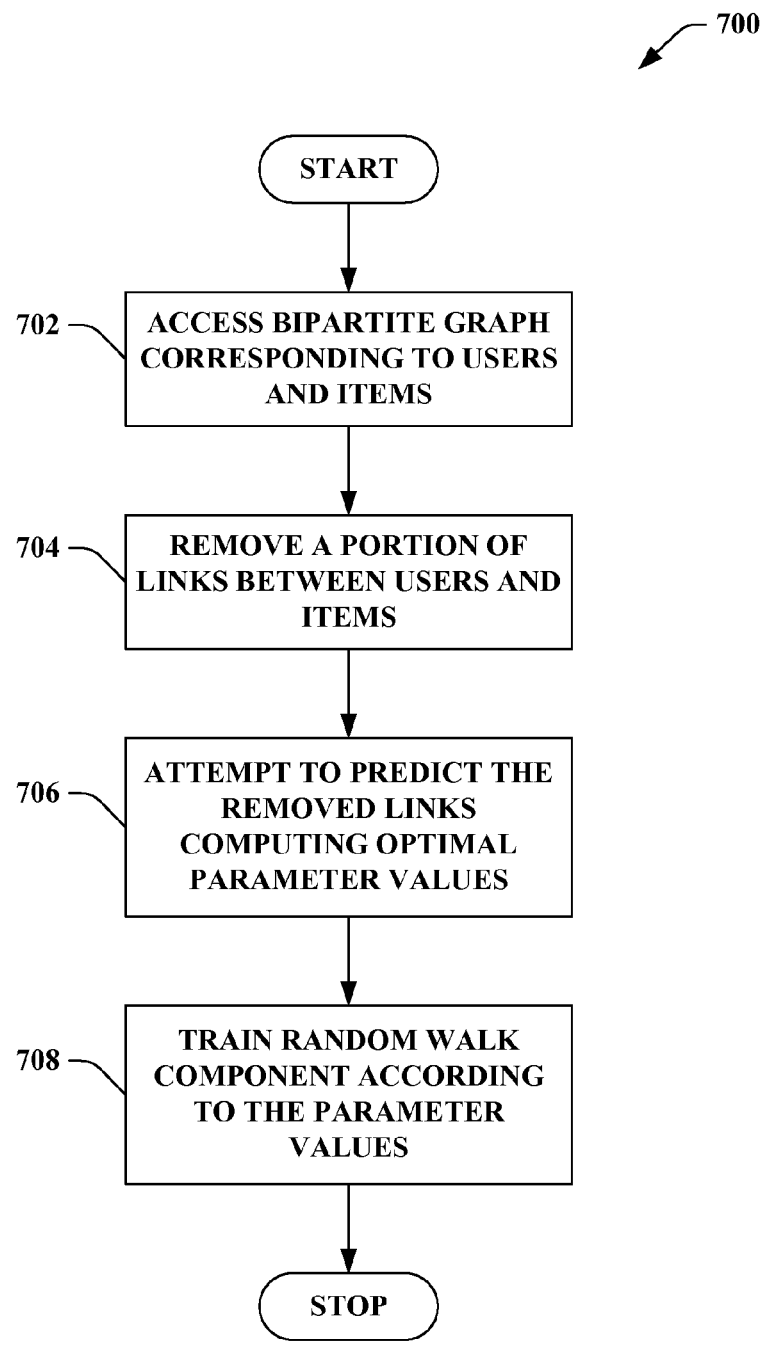
FIG. 7 illustrates an exemplary flow chart for training a random walk of an augmented bipartite graph.
Figure 8:
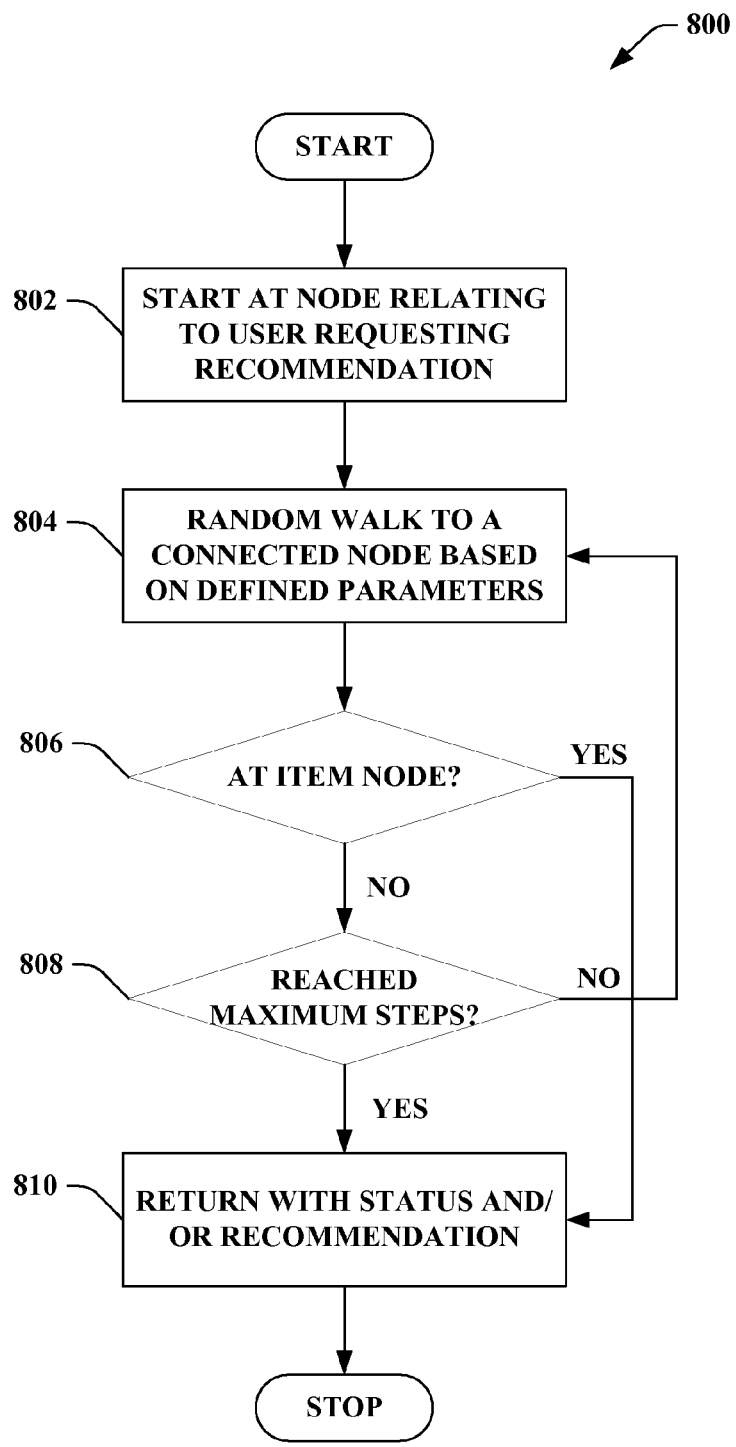
FIG. 8 illustrates an exemplary flow chart for recommending items.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 6 illustrates a methodology 600 for creating an augmented bipartite graph from data. For example, the data can relate to a set of users and items related to the users; in one embodiment, the items can be such that multiple users can be related to the same item. For example, as discussed above, this can relate to a remote gaming service where the plurality of users own video games; additionally, it can relate to a music store having a number of subscribers that independently own one or more song tracks. Moreover, the data can have information relating to links between users, such as social links for example. At 602, the information is received. At 604, nodes are created for each user and each item in this embodiment. The nodes can be aligned in two rows, in theory; one related to users and the other related to items. Additionally, or alternatively, a transition matrix can be created of n×n dimension, where n is the total number of user nodes added to the total number of item nodes.

At 606, links are created from a user to the items that user owns. For example, in the gaming system, links can be drawn from each user to all the games they own. At 608, links can also be drawn between users to indicate substantially any type of relation (such as a specified friend). Additionally, the links can be determined by a system according to similarity and inserted in that regard. Moreover, a transition matrix created as described above can be populated with values indicative of the links. It is to be appreciated that the values can be a number merely identifying a link or a number identifying the probability of moving to the link from an original link as shown above.

FIG. 7 displays a methodology 700 for training a component to walk a augmented bipartite graph relating to a plurality of user and item nodes. At 702, a augmented bipartite graph is accessed for training; the graph can comprise a plurality of node related to users and items owned by the users, where the users own some common items. Also, the users can have a social connection/relation to one another, such as friendship and/or family. The graph can be such that certain nodes are absorbing so traversal of the graph can end on the absorbing nodes, for example. At 704, a portion of the links are removed to begin training on the graph. The links can be referred to as "training links" and can be removed temporarily. The links are preferably related to item ownership, but can also be related to other things such as social connection. At 706, prediction of the training links is attempted to find one or more optimal parameters to use when traversing the graph. For example, links between users can be weighted to indicate a similarity between the users. Additionally, a probability for choosing a user node versus an item node in a random walk can be weighted such that one or the other can be chosen more frequently to provide a good distribution of recommendations. Different values for these parameters can be tested by walking the graph utilizing the parameters to predict the training links. Parameter values that give a high probability as to the existence of the removed link(s) can be optimal in traversing the graph in the future for recommendation purposes. Thus, the values can be provided to the component that will walk the graph to determine recommendations to facilitate good recommendations (e.g. recommendations that correlate to existing ownership links). The values can be on many levels as well; for example, different values for the parameters can be chosen based on starting node, type of item being recommended, etc. At 708, a random walk is performed on the graph to determine recommendations as trained according to the optimal parameters chosen.

FIG. 8 illustrates a methodology 800 for randomly walking a augmented bipartite graph comprising a plurality of user and item nodes; the item nodes can be self-describing as discussed, supra. At 802, the random walk begins at a node relating to the user requesting a recommendation. As described previously, the recommendation need not necessarily come from user request; rather it can additionally or alternatively originate from another component, such as an advertising component, pop-up window, etc., or even another user who wishes to provide a recommendation. At 804, the random walk proceeds by randomly selecting a node connected to the starting node based on defined parameters. As described, parameters can be defined related to many aspects of performing the random walk to provide some guidance (or probability) so the walk is not completely evenly random. For example, without parameters, a walk can begin at a user node and decision would be made whether to traverse another connected user node or a connected item node. At an even distribution, there is a 50% chance of choosing to traverse a user node next and a 50% chance of choosing to traverse an item node next. Once this determination has been made, there is an equal probability of choosing one of the available user or game nodes. In practice, however, this might not be desirable; to this end, these parameters can be weighted such that choosing a user node over an item node can be weighted more heavily than vice versa. Additionally, similarities can be specified and/or computed for the different users with respect to each other, and the weight of the similarities can be defined. Moreover, preferences can be defined for the games; the preference can relate to the user who owns the game's preference, and this preference can become apparent in making a recommendation.

After the step is made to the next node, at 806 the node is checked to see if it is an item node. As stated, the item nodes can be absorbing such that the walk ends on the item node. If the node is an item node, then the node information, such as the recommendation, is returned at 810. It is to be appreciated that this can be returned with a status as well as other information. If the node is not an item node, then at 808 a determination is made as the whether a maximum number of steps has been reached. For example, the random walk may only be desired for a threshold number of steps if all the available options have been exhausted, for example, or if the information sought only pertains to a number of steps. If the maximum has not been reached then at 804, another node is selected where the node is connected to the current node. If the maximum number of steps has been reached, then at 810 a status code is returned; it is to be appreciated that other data can be returned as well, for example data about the ending node. Thus, the walk can proceed until an item node is hit and/or until a maximum number of steps has been reached.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
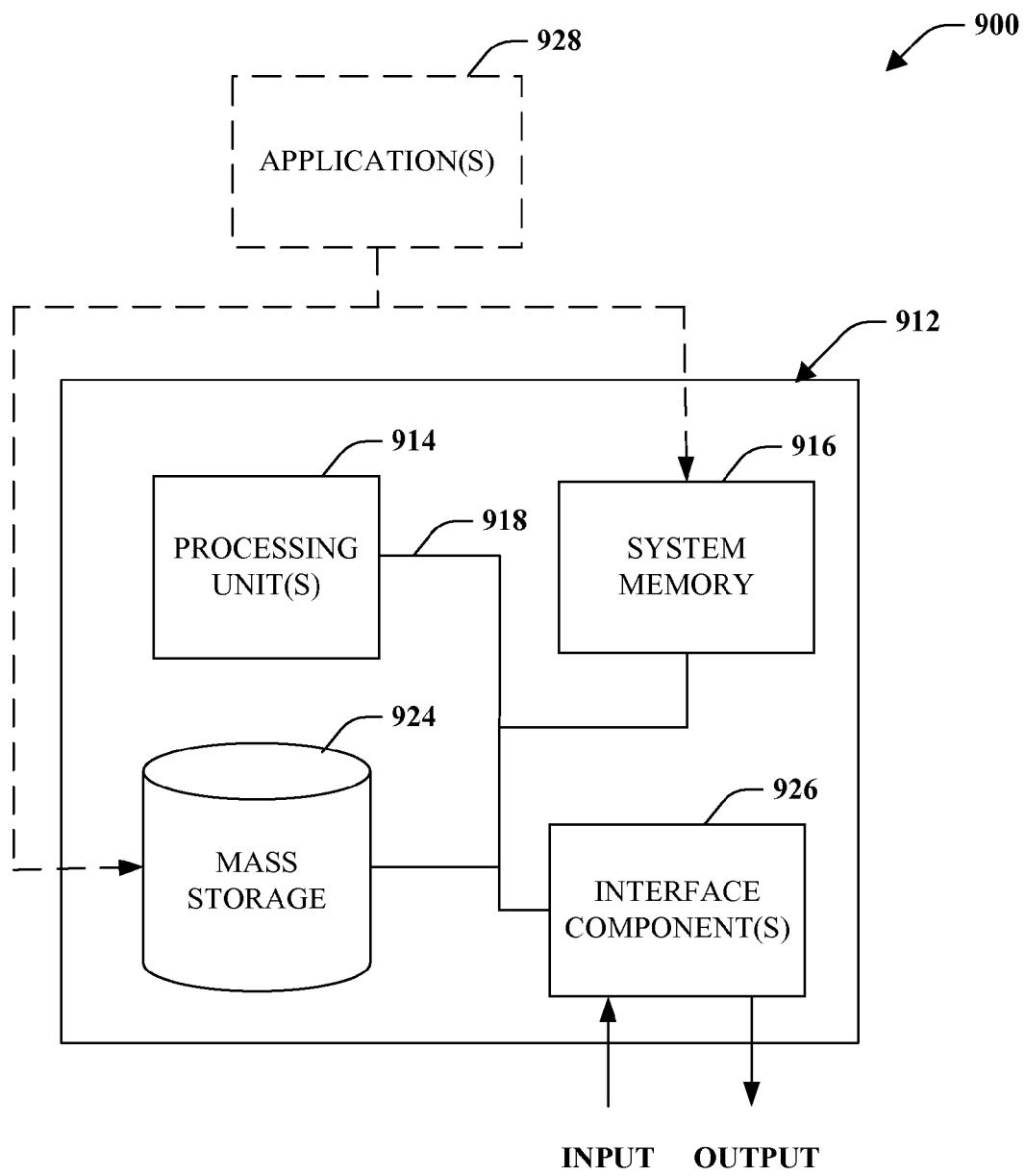
FIG. 9 is a schematic block diagram illustrating a suitable operating environment.
Figure 10:
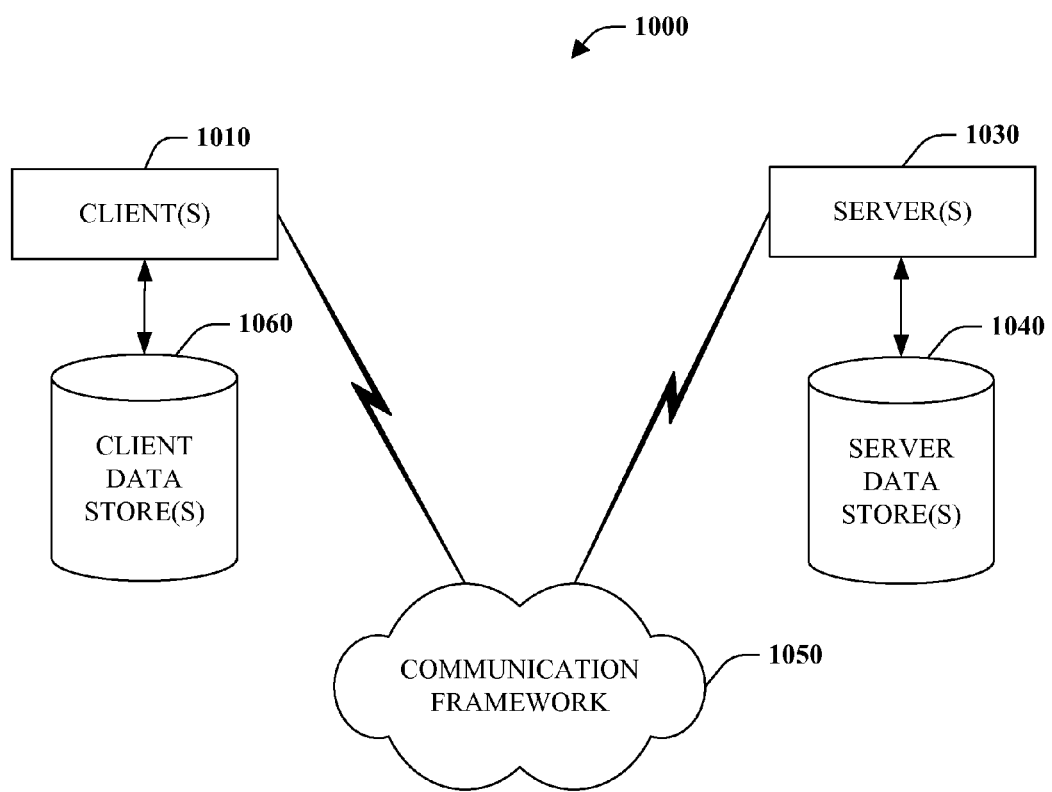
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more users can be executing as a client 1010, for example, the client can be a computer, video game console, etc. The client(s) 1010 can be connected to one or more server(s) 1030 providing media services such as remote game play and/or music purchasing. The server(s) 1030 can operate a service-based platform, for example, and one or more data stores 1040 can store data related to the service, such as games played, high scores, game preferences, user friends, etc. (or in the music example, songs downloaded, song ratings, users downloading similar songs, etc.). The client(s) 1010 can receive a recommendation or a list of recommendations from one or more of the server(s) 1030 in accordance with embodiment described above; the recommendation is made based on the data stored in the data store 1040 regarding the service data related to the plurality of clients 1010 or other users. The client can store the recommendation or list in its own data store 1060.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system for specifying at least one parameter for a random walk over a graph, comprising:
   a processor;
   a memory communicatively coupled to the processor, the memory comprising components including:
      a graph generation component that creates a graph from a portion of input data, the graph having a plurality of disparate nodes and two or more links between the nodes based at least in part on the data;
      a training component that learns the at least one parameter with respect to performing a random walk on the graph, the parameter corresponds to at least one probability that affects direction of the random walk, the training component further comprising:
         a link removal component to temporarily remove at least one link of the two or more links to define a temporarily removed link; and
         a link prediction component to adjust the at least one parameter to predict the temporarily removed link.

2. The system of claim 1, the two or more nodes are of disparate types and the one or more links are of disparate types, the training component determines the parameter based at least in part on one or more of the disparate node or link types.

3. The system of claim 1, at least one of the nodes is absorbing such that a random walk terminates with a probability greater than zero upon reaching the node, the training component computes an absorption probability matrix corresponding to the nodes based on the data.

4. The system of claim 3, further comprising a recommendation component that provides a recommendation list with respect to a user, the recommendation list comprises one or more recommendations, corresponding to a subset of the nodes, ranked according to a decreasing absorption probability determined from the absorption probability matrix.

5. The system of claim 1, further comprising a recommendation component that utilizes a cost function to recommend one or more items to a user sorted according to the cost function, the cost function is at least one of a hitting time or a commute time between nodes and the items correspond to one or more of the nodes.

6. The system of claim 1, a stationary distribution is computed from probabilities associated with a random walk over the two or more nodes according to the parameter, the stationary distribution is utilized to provide a static rank or score.

7. The system of claim 1, the training component determines the parameter in conjunction with a cost function, the cost function is one of optimizing hit time, optimizing commute time, or an absorption probability.

8. The system of claim 7, the cost function relates to the two or more nodes or one or more links of the graph.

9. The system of claim 7, further comprising a recommendation component that utilizes the cost function to recommend one or more items to a user, the items corresponding to at least one of the nodes.

10. A method for recommending an item to a user in a media service platform, comprising:
    under control of one or more processors executing computer-executable instructions:
       creating an augmented bipartite graph utilizing data from a platform, with nodes of the graph being created for each user and item in the data, at least one user node is linked to at least one item node according to the data;
       randomly walking the graph starting at a user node until an item node is reached, the decision of which node to traverse at each step is based on one or more weight parameters;
       recommending the reached item node to a user corresponding to the starting user node; and
       determining the one or more weight parameters in conjunction with a cost function such that a hit time is minimized while an absorption probability is maximized.

11. The method of claim 10, at least one user node is connected to at least one item node based on ownership of the item.

12. The method of claim 10, at least one user node is connected to at least one disparate user node based on a social relationship.

13. The method of claim 10, further comprising determining the one or more weight parameter in conjunction with a cost function.

14. The method of claim 10, at least one of the one or more weight parameters corresponds to utilizing a similarity calculation in choosing which user node to traverse.

15. The method of claim 14, the similarity is calculated between at least two user nodes, u and v, using a similarity formula, the formula is $$sim(u, v) = \frac{\text{\# items in common between } u \text{ and } v}{\sqrt{\text{\# items owned by } u} \sqrt{\text{\# items owned by } v}}.$$

16. The method of claim 10, further comprising determining the one or more weight parameters by removing at least one link between a user and an item and choosing at least one value for the one or more weight parameters that provide a high probability to existence of the link.

17. The method of claim 10, the platform is a gaming service, the users in the data correspond to the users of the service, and the items in the data correspond to games collectively owned by the users.

18. The method of claim 10, further comprising ranking a list of recommendations of items according to a calculated probability of reaching the items in the random walk.

19. The method of claim 10, further comprising computing a stationary distribution from a matrix corresponding to at least one probability of randomly walking from at least one node to at least another node.

20. A system for providing recommendations, comprising:
a processor;
a memory communicatively coupled to the processor, the memory comprising components including:
a recommendation component for providing a recommendation to a user based on a random walk of a graph having a plurality of nodes related to a plurality of users and a plurality of items owned by the plurality of users, the nodes having a plurality of links therebetween according to ownership and social connections between the plurality of users, the recommendation starting from a node relating to the user and ending on an item node relating to an item the user does not already own; and
a training component for specifying parameters for weighing decisions of the random walk and
for determining the specified parameters to make optimal recommendations, the training component further comprising:
a link removal component to temporarily remove at least one link of the plurality of links to define a temporarily removed link; and
a link prediction component to adjust the at least one parameter to predict the temporarily removed link.

* * * * *